(12) United States Patent
Macdonald (10) Patent No.: US 12,495,768 B2
(45) Date of Patent: Dec. 16, 2025

(54) EQUINE HOOF BOOT, STRAP AND TENSIONER THEREFOR

(71) Applicant: Scootboot Pty Ltd, Cambridge (AU)

(72) Inventor: David Duncan Macdonald, Cambridge (AU)

(73) Assignee: Scootboot Pty Ltd, Cambridge (AU)

( * ) Notice: Subject to any disclaimer, the term of this patent is extended or adjusted under 35 U.S.C. 154(b) by 57 days.

(21) Appl. No.: 17/920,043

(22) PCT Filed: Apr. 21, 2021

(86) PCT No.: PCT/AU2021/050358
§ 371 (c)(1),
(2) Date: Oct. 20, 2022

(87) PCT Pub. No.: WO2021/212174
PCT Pub. Date: Oct. 28, 2021

(65) Prior Publication Data
US 2023/0172161 A1 Jun. 8, 2023

(30) Foreign Application Priority Data

Apr. 22, 2020 (AU) ................................ 2020901269

(51) Int. Cl.
*A01K 13/00* (2006.01)
*B68B 7/00* (2006.01)
*B68C 5/00* (2006.01)
(52) U.S. Cl.
CPC .............. *A01K 13/007* (2013.01); *B68B 7/00* (2013.01); *B68C 5/00* (2013.01)

(58) Field of Classification Search
CPC ............ A01K 13/007; B68C 5/00; B68B 7/00
See application file for complete search history.

(56) References Cited

U.S. PATENT DOCUMENTS

| 28,218 A | 5/1860 | Valkenburgh |
| 56,477 A | 7/1866 | Wilkinson |
| 57,029 A | 8/1866 | Wilkinson |
| 65,231 A | 5/1867 | Jennings |

(Continued)

FOREIGN PATENT DOCUMENTS

| AT | 010503 U1 | 5/2009 |
| AT | 519083 A1 | 3/2018 |

(Continued)

OTHER PUBLICATIONS

International Preliminary Report on Patentability Dated Aug. 25, 2021 From the International Preliminary Examining Authority Re. Application No. PCT/AU2021/050358. (15 Pages).

(Continued)

*Primary Examiner* — Son T Nguyen
(74) *Attorney, Agent, or Firm* — David D. Brush; Westman, Champlin & Koehler, P.A.

(57) ABSTRACT

An equine boot comprising:
  a sole for receiving a bottom of a horse's hoof;
  an upper which, in use, receives at least a portion of a wall of the hoof; and
  a retention means at a rear of the boot which, in use, is generally proximate a cleft of the hoof, the retention means being configured for engagement with a securing strap, which strap is securable to the boot and hoof for retaining the boot thereto.

16 Claims, 10 Drawing Sheets

(56) References Cited

U.S. PATENT DOCUMENTS

| | | | |
|---|---|---|---|
| 70,035 A | 10/1867 | Sloat | |
| 70,274 A | 10/1867 | Schreiner | |
| 72,594 A | 12/1867 | Bishops | |
| 79,128 A | 6/1868 | Jones | |
| 96,104 A | 10/1869 | Haedrich | |
| 119,906 A | 10/1871 | Williams | |
| 124,215 A | 3/1872 | Moran et al. | |
| 149,930 A | 4/1874 | Higgins | |
| 164,174 A | 6/1875 | Jacobs | |
| 167,895 A | 9/1875 | Hall | |
| 177,991 A | 5/1876 | Cook | |
| 180,295 A | 7/1876 | White | |
| 181,750 A | 8/1876 | Webber | |
| 217,582 A | 7/1879 | Campbell | |
| 231,953 A | 9/1880 | Campbell | |
| 267,855 A | 11/1882 | Fenley | |
| 285,552 A | 9/1883 | Barnard | |
| 286,319 A | 10/1883 | Lightford et al. | |
| 288,220 A | 11/1883 | Fennell | |
| 288,836 A | 11/1883 | Miller | |
| 330,241 A | 11/1885 | Keagle | |
| 338,166 A | 3/1886 | Dumke | |
| 339,050 A | 3/1886 | Drew | |
| 342,790 A | 6/1886 | Fenton | |
| 349,668 A | 9/1886 | St. John | |
| 367,271 A | 7/1887 | Coolidge | |
| 381,388 A * | 4/1888 | Sidebotham | A01K 13/007 54/82 |
| 392,291 A * | 11/1888 | Schlid et al. | A01K 13/007 54/82 |
| 440,048 A | 11/1890 | Mayow | |
| 448,312 A | 3/1891 | Barclay | |
| 476,517 A | 6/1892 | Clark et al. | |
| 519,047 A | 5/1894 | Rogers | |
| 519,822 A * | 5/1894 | Sidebotham | A01K 13/007 168/19 |
| D26,832 S | 3/1897 | Hirsch | |
| 601,541 A | 3/1898 | Anderson | |
| 617,153 A | 1/1899 | Galpin | |
| 625,810 A | 5/1899 | Shappell | |
| 630,310 A | 8/1899 | Agnew | |
| 661,424 A | 11/1900 | Pflueger | |
| 697,791 A | 4/1902 | Boumal | |
| 708,983 A | 9/1902 | Bartlet | |
| 719,687 A | 2/1903 | Nickerson | |
| 759,636 A | 5/1904 | Ryan | |
| 777,348 A | 12/1904 | Luther | |
| 797,895 A | 8/1905 | Johnson | |
| 798,598 A | 9/1905 | Conn | |
| 840,892 A * | 1/1907 | Adam | A01L 7/04 182/108 |
| 918,556 A | 4/1909 | Kalm | |
| 1,035,537 A | 8/1912 | Cook | |
| 1,036,750 A | 8/1912 | Tuttle | |
| 1,039,002 A | 9/1912 | Winston | |
| 1,054,563 A | 2/1913 | Kiso | |
| 1,096,912 A | 5/1914 | Herman | |
| 1,129,683 A | 2/1915 | Jaffie | |
| 1,211,268 A | 1/1917 | Zadina | |
| 1,218,901 A | 3/1917 | Saxton | |
| 1,270,207 A | 6/1918 | Preston | |
| 1,274,483 A | 8/1918 | Wiesenberg | |
| 1,294,896 A | 2/1919 | Grant | |
| 1,298,364 A | 3/1919 | McCoy | |
| 1,328,708 A | 1/1920 | Blondeau | |
| 1,879,991 A | 9/1932 | Pratt | |
| 2,064,566 A | 12/1936 | Richman | |
| 2,535,394 A | 12/1950 | Davis | |
| 2,572,889 A | 10/1951 | Strykower | |
| 2,619,744 A | 12/1952 | Mattes | |
| 2,886,935 A | 5/1959 | Shelton | |
| 3,286,441 A | 11/1966 | Eanes | |
| 3,364,500 A | 1/1968 | Fox | |
| 3,439,670 A | 4/1969 | Schuerch | |
| 3,703,209 A | 11/1972 | Glass | |
| 3,732,929 A | 5/1973 | Glass | |
| 3,794,119 A | 2/1974 | Paiso et al. | |
| 3,867,905 A | 2/1975 | Vail, Jr. | |
| 3,967,683 A | 7/1976 | Ensinozo | |
| 4,019,463 A | 4/1977 | Kitchen | |
| 4,174,754 A | 11/1979 | Glass | |
| 4,185,695 A | 1/1980 | Hancock | |
| 4,189,004 A | 2/1980 | Glass | |
| 4,212,356 A | 7/1980 | Battle | |
| 4,265,314 A | 5/1981 | Tovim | |
| 4,346,762 A | 8/1982 | Tovim | |
| 4,444,269 A | 4/1984 | Laurent | |
| 4,470,411 A | 9/1984 | Hoyt, Jr. | |
| 4,665,590 A | 5/1987 | Udelhofen et al. | |
| D293,043 S | 12/1987 | Zamboni | |
| 4,736,800 A | 4/1988 | Rohner | |
| D295,907 S | 5/1988 | Decker | |
| 4,744,422 A | 5/1988 | Dallmer | |
| D309,619 S | 7/1990 | Kalbach | |
| 4,981,010 A | 1/1991 | Orza et al. | |
| 5,148,872 A | 9/1992 | Dallmer | |
| 5,174,382 A | 12/1992 | Wright | |
| 5,209,048 A | 5/1993 | Hanson | |
| D343,291 S | 1/1994 | Langford | |
| 5,282,825 A | 2/1994 | Muck et al. | |
| 5,345,656 A | 9/1994 | Merritt | |
| D354,760 S | 1/1995 | Wolff | |
| 5,481,888 A | 1/1996 | Perry | |
| 5,511,756 A | 4/1996 | Spradling | |
| 5,528,885 A | 6/1996 | Chamberlain | |
| 5,600,901 A | 2/1997 | Leonor | |
| 5,608,918 A | 3/1997 | Salvaggio | |
| D382,503 S | 8/1997 | Kalbach | |
| 5,715,661 A | 2/1998 | Meyers | |
| D410,336 S | 6/1999 | Frisoni | |
| 6,056,173 A | 5/2000 | Gillespie | |
| 6,058,578 A | 5/2000 | Lan | |
| 6,192,989 B1 | 2/2001 | Tooman | |
| 6,305,328 B1 | 10/2001 | Marquis | |
| 6,560,951 B1 | 5/2003 | Wood | |
| 6,619,238 B1 | 9/2003 | Amato | |
| 6,662,537 B1 | 12/2003 | Wilson | |
| 6,694,713 B1 * | 2/2004 | MacDonald | A01K 13/007 54/82 |
| D505,259 S | 5/2005 | Heatherwick | |
| 6,941,619 B2 | 9/2005 | Mackay et al. | |
| 7,032,367 B1 * | 4/2006 | Yoho | A01K 13/007 54/82 |
| D543,697 S | 6/2007 | Heatherwick | |
| D557,008 S | 12/2007 | Stiller | |
| 7,302,788 B1 | 12/2007 | Chang | |
| D568,148 S | 5/2008 | Tamura et al. | |
| 7,445,051 B2 | 11/2008 | Ruetenik | |
| D597,824 S | 8/2009 | Wang | |
| 7,578,115 B2 | 8/2009 | Ford et al. | |
| D614,018 S | 4/2010 | Mcclanahan et al. | |
| D615,253 S | 5/2010 | Goodell | |
| D629,290 S | 12/2010 | Stevens et al. | |
| D638,330 S | 5/2011 | Fahrendorff et al. | |
| 8,151,545 B1 | 4/2012 | Ford | |
| D662,436 S | 6/2012 | Kalbach | |
| 8,245,418 B2 | 8/2012 | Paintin et al. | |
| D667,749 S | 9/2012 | Case et al. | |
| D677,842 S | 3/2013 | Kalbach | |
| D679,218 S | 4/2013 | Kalbach | |
| 8,413,412 B2 | 4/2013 | Ford | |
| D695,976 S | 12/2013 | Allen, Jr. | |
| D699,144 S | 2/2014 | Kalbach | |
| D711,602 S | 8/2014 | Driver | |
| 8,931,244 B2 | 1/2015 | Gola | |
| D743,691 S | 11/2015 | Romano | |
| D765,413 S | 9/2016 | Derr | |
| D770,170 S | 11/2016 | Akana et al. | |
| 9,538,738 B2 | 1/2017 | Bergeleen et al. | |
| 9,704,368 B2 | 7/2017 | Dehart | |
| D793,075 S | 8/2017 | Ma et al. | |
| D796,124 S | 8/2017 | Ying | |
| D851,920 S | 6/2019 | Mouriz | |
| 10,306,972 B2 | 6/2019 | Mendez et al. | |

(56) References Cited

U.S. PATENT DOCUMENTS

| | | | |
|---|---|---|---|
| 10,330,173 | B1 | 6/2019 | Mckye et al. |
| D854,916 | S | 7/2019 | Derr |
| D880,148 | S | 4/2020 | Akana et al. |
| D899,710 | S | 10/2020 | MacDonald |
| D950,699 | S | 5/2022 | Buckley et al. |
| 2003/0037416 | A1 | 2/2003 | Buettell |
| 2003/0070403 | A1 | 4/2003 | Osha |
| 2005/0066632 | A1 | 3/2005 | Ford et al. |
| 2005/0092260 | A1 | 5/2005 | Paxton et al. |
| 2005/0150197 | A1 | 7/2005 | Ford |
| 2006/0064950 | A1 | 3/2006 | Ford et al. |
| 2006/0162296 | A1 | 7/2006 | Maestrini |
| 2007/0000105 | A1* | 1/2007 | Grande ................. F16G 11/101 24/712.5 |
| 2007/0039565 | A1 | 2/2007 | Krottinger |
| 2007/0068125 | A1 | 3/2007 | Davis |
| 2007/0084020 | A1 | 4/2007 | Chui et al. |
| 2007/0113524 | A1 | 5/2007 | Lander |
| 2007/0121987 | A1 | 5/2007 | Fielding, Jr. |
| 2008/0083198 | A1 | 4/2008 | Wilson |
| 2008/0083542 | A1 | 4/2008 | Ford |
| 2008/0264005 | A1 | 10/2008 | Ford |
| 2009/0032270 | A1 | 2/2009 | Ruetenik |
| 2009/0071109 | A1 | 3/2009 | Ford et al. |
| 2009/0100808 | A1 | 4/2009 | Ford |
| 2009/0120980 | A1 | 5/2009 | Calayo |
| 2010/0114155 | A1 | 5/2010 | Siani |
| 2010/0229508 | A1* | 9/2010 | Gola .................... A01K 13/007 54/82 |
| 2010/0287791 | A1 | 11/2010 | Liu |
| 2011/0000173 | A1 | 1/2011 | Lander |
| 2011/0197554 | A1 | 8/2011 | Ruetenik |
| 2012/0005995 | A1* | 1/2012 | Emery ................. A01K 13/007 54/82 |
| 2012/0018175 | A1 | 1/2012 | Revheim et al. |
| 2012/0227364 | A1 | 9/2012 | Ford |
| 2013/0008139 | A1 | 1/2013 | Lander |
| 2013/0014960 | A1 | 1/2013 | Palmer et al. |
| 2013/0019575 | A1 | 1/2013 | Bartlett |
| 2013/0105180 | A1 | 5/2013 | Valer Fuentes |
| 2013/0112437 | A1 | 5/2013 | Sledd et al. |
| 2014/0007548 | A1 | 1/2014 | Revheim et al. |
| 2014/0116733 | A1 | 5/2014 | Finnegan |
| 2014/0144109 | A1 | 5/2014 | Burr |
| 2014/0166006 | A1 | 6/2014 | Meier |
| 2014/0231100 | A1 | 8/2014 | Ford |
| 2014/0251642 | A1 | 9/2014 | Revheim et al. |
| 2014/0331944 | A1 | 11/2014 | Chirico |
| 2014/0367124 | A1 | 12/2014 | Moller et al. |
| 2014/0374124 | A1 | 12/2014 | Mahidhara |
| 2015/0060089 | A1 | 3/2015 | Kunkle |
| 2015/0101833 | A1 | 4/2015 | Ford |
| 2015/0152942 | A1 | 6/2015 | Kindstrand et al. |
| 2015/0238344 | A1 | 8/2015 | Nylund |
| 2015/0366181 | A1 | 12/2015 | Koenig et al. |
| 2016/0029609 | A1 | 2/2016 | Macdonald |
| 2016/0227739 | A1 | 8/2016 | Yang |
| 2016/0324136 | A1 | 11/2016 | Silanus et al. |
| 2017/0172134 | A1 | 6/2017 | Ruetenik |
| 2017/0208791 | A1 | 7/2017 | Eberle et al. |
| 2018/0042210 | A1 | 2/2018 | Edwards |
| 2019/0364848 | A1 | 12/2019 | Ford |
| 2020/0178502 | A1 | 6/2020 | Macdonald |
| 2021/0219534 | A1 | 7/2021 | Pereira Suarez et al. |
| 2022/0333668 | A1 | 10/2022 | Piac |
| 2024/0225199 | A1 | 7/2024 | Perrier et al. |

FOREIGN PATENT DOCUMENTS

| | | | | |
|---|---|---|---|---|
| AT | 519658 | B1 | 9/2018 | |
| AU | 2006100740 | A4 * | 10/2006 | ........... A01K 13/007 |
| AU | 2013200509 | A1 | 2/2013 | |
| AU | 2014231767 | A1 | 9/2014 | |
| BE | 1015985 | A6 | 12/2005 | |
| BR | 8307232 | A | 8/1985 | |
| CA | 2824535 | A1 | 7/2012 | |
| CN | 102811609 | A | 12/2012 | |
| CN | 103385228 | A | 11/2013 | |
| CN | 204206956 | U | 3/2015 | |
| CN | 204206957 | U | 3/2015 | |
| DE | 155659 | C | 7/1902 | |
| EP | 1210873 | A2 * | 6/2002 | ........... A01K 13/007 |
| EP | 1738641 | | 1/2007 | |
| EP | 2409565 | A1 | 1/2012 | |
| ES | 1072993 | U | 10/2010 | |
| GB | 2128867 | A | 5/1984 | |
| GB | 2338394 | A | 12/1999 | |
| GB | 2492266 | B | 5/2014 | |
| GB | 2517176 | A | 2/2015 | |
| IE | S86373 | B2 | 4/2014 | |
| IN | 2317DEN2015 | A | 8/2015 | |
| WO | WO-03015509 | A1 * | 2/2003 | ........... A01K 13/007 |
| WO | 2004047526 | A1 | 6/2004 | |
| WO | 2004064668 | A2 | 8/2004 | |
| WO | 2004071226 | A2 | 8/2004 | |
| WO | 2006001764 | A1 | 1/2006 | |
| WO | 2008025065 | A1 | 3/2008 | |
| WO | 2009050750 | A1 | 4/2009 | |
| WO | 2009120085 | A1 | 10/2009 | |
| WO | 2012039627 | A1 | 3/2012 | |
| WO | 2014046634 | A1 | 3/2014 | |
| WO | 2014138790 | A1 | 9/2014 | |
| WO | 2014166006 | A1 | 10/2014 | |
| WO | 2014176705 | A1 | 11/2014 | |
| WO | 2015006818 | A1 | 1/2015 | |
| WO | 2015026253 | A1 | 2/2015 | |
| WO | 2015069307 | A1 | 5/2015 | |
| WO | 2015157817 | A1 | 10/2015 | |
| WO | 2015186036 | A1 | 10/2015 | |
| WO | 2015172211 | A1 | 11/2015 | |
| WO | WO-2018033650 | A1 * | 2/2018 | ........... A01K 13/007 |
| WO | WO 2018/218307 | | 12/2018 | |
| WO | WO 2020/019018 | | 1/2020 | |

OTHER PUBLICATIONS

International Search Report and the Written Opinion Dated Jun. 25, 2021 From the International Searching Authority Re. Application No. PCT/AU2021/050358. (9 Pages).

International Search Report dated Apr. 11, 2014 for corresponding International Patent Application PCT/AU2013/000249, filed Mar. 13, 2014.

Written Opinion of the International Searching Authority dated Sep. 15, 2015 for corresponding International Patent Application PCT/AU2013/000249, filed Mar. 13, 2014.

Partial European Search Report dated Oct. 13, 2016 for corresponding European Application No. 14765745.

Espacenet search results on Apr. 20, 2016 10:55—Shoe of hoof or hooves or feet or hose or equine or retain or secure or lock or bulb in teh title or abstract and A01L1/low or A0L13/low as the IPC classification.

Notice of Allowance dated Jul. 22, 2020 for corresponding U.S. Appl. No. 29/677,621, filed Jan. 22, 2019.

Office Action dated Oct. 24, 2017 for corresponding U.S. Appl. No. 14/777,201, filed Sep. 15, 2015.

Final Office Action dated Jul. 5, 2018 for corresponding U.S. Appl. No. 14/777,201, filed Sep. 15, 2015.

Office Action dated Dec. 13, 2018 for corresponding U.S. Appl. No. 14/777,201, filed Sep. 15, 2015.

Final Office Action dated May 15, 2019 for corresponding U.S. Appl. No. 14/777,201, filed Sep. 15, 2015.

Office Action dated Nov. 4, 2019 for corresponding U.S. Appl. No. 14/777,201, filed Sep. 15, 2015.

Final Office Action dated Apr. 8, 2020 for corresponding U.S. Appl. No. 14/777,201, filed Sep. 15, 2015.

Notice of Allowance dated Oct. 15, 2020 for corresponding U.S. Appl. No. 14/777,201, filed Sep. 15, 2015.

Australian Examination Report for AU Application No. 2019268145, dated Nov. 17, 2020.

(56) References Cited

OTHER PUBLICATIONS

Hufcheck—Floating Boots Model Traiuner 2014—English Version, 5 Screenshots, YouTube, (Jan. 20, 2015), URL: https://youtu.be/9Not4c_jpgc, [viewed on the Internet on Jan. 3, 2019].

International Search Report dated Sep. 13, 2019 for corresponding International Application No. PCT/AU2019/050761, Jul. 22, 2019.

Written Opinion of the International Searching Authority dated Sep. 13, 2019 for corresponding International Application No. PCT/AU2019/050761, filed Jul. 22, 2019.

U.S. Patent Office issued prosecution for U.S. Appl. No. 17/262,486, filed Jan. 22, 2021, including: Notice of Allowance and Fees Due (PTOL-85) issued Apr. 1, 2025, 8 pages; Non-Final Rejection issued Aug. 20, 2024, 17 pages; Advisory Action issued Jul. 1, 2024, 4 pages; Final Rejection issued Apr. 12, 2024, 13 pages; Non-Final Rejection issued Sep. 29, 2023, 15 pages; Advisory Action issued Jun. 29, 2023, 4 pages; Final Rejection issued Mar. 24, 2023, 22 pages; Non-Final Rejection issued Oct. 19, 2022, 28 pages; 111 pages.

Notice of Allowance dated Sep. 2, 2025 for corresponding U.S. Appl. No. 17/262,486, filed Jan. 22, 2021.

\* cited by examiner

EQUINE HOOF BOOT, STRAP AND TENSIONER THEREFOR

RELATED APPLICATIONS

This application is a National Phase of PCT Patent Application No. PCT/AU2021/050358 having International filing date of Apr. 21, 2021, which claims the benefit of priority of Australia Patent Application No. 2020901269 filed on Apr. 22, 2020. The contents of the above applications are all incorporated by reference as if fully set forth herein in their entirety.

The entire contents of Australian provisional patent application numbers 2018902662 and 2018904555 and PCT/AU2019/050761 are incorporated herein by reference.

FIELD AND BACKGROUND OF THE INVENTION

The present invention relates to an equine hoof boot, a securing strap for securing the boot to the hoof, and a tensioner for tensioning the strap.

The problems associated with using metal horseshoes are well known though they continue to be used by some. Numerous hoof boots have previously been proposed with varying degrees of success. A good discussion of the prior art can be found in PCT/AU2014/000249, also in the name of the present applicant, who has come up with methods to improve upon prior art hoof boots.

A common problem with prior art hoof boots is that they can be dislodged from the hoof, particularly when traversing deep mud that sucks the boot from the hoof during withdrawal. Losing a hoof boot can be hazardous to the horse as it can leave their hoof vulnerable to damage, and frustrating as it can impede the task the horse was undertaking when it lost the boot. Losing a hoof boot can also be expensive if lost boots cannot be retrieved.

Another problem with prior art hoof boots is that a rear of the boots is often at least partially closed and/or comprise means arranged to engage against and physically contact substantial regions of the bulbs of the hoof to help retain the boot to the hoof. However, over extended periods and distances, such contact with the bulbs can be uncomfortable and even painful for the horse.

There is a need to address the above, and/or at least provide a useful alternative.

SUMMARY OF THE INVENTIONS

According to a first aspect of the present invention, there is provided an equine boot comprising:
  a sole for receiving a bottom of a horse's hoof;
  an upper which, in use, receives at least a portion of a wall of the hoof; and
  a retention means at a rear of the boot which, in use, is generally proximate a cleft of the hoof, the retention means being configured for engagement with a securing strap, which strap is securable to the boot and hoof for retaining the boot thereto.

In embodiments of the invention, the retention means comprises securement means for releasably securing the strap to the boot.

In embodiments of the invention, the securement means has an opening configured for adjustably receiving the strap.

In embodiments of the invention, in use, the retention means is configured to engage the cleft.

In embodiments of the invention, the retention means comprises a shank or web extending upwardly from the sole.

In embodiments of the invention, the upper comprises opposed side walls, which, in use, at least partially cover respective sides of the hoof wall, the side walls terminating towards a rear of the hoof such that a rear of the boot is generally open and bulbs of the hoof are generally uncovered by the boot.

In embodiments of the invention, the retention means is integrally formed with the sole.

In embodiments of the invention, the sole and upper define a shell configured to substantially cover an underside of the hoof and the front and sides of the hoof wall.

In embodiments of the invention, a front of the upper is formed with one or more openings adapted to allow sidewalls of the upper to be pried away from one another for fitting of the hoof to the boot.

In embodiments of the invention, sidewalls of the upper comprise respective elongate openings adapted to accommodate hoof growth.

According to a second aspect of the present invention, there is provided an equine boot comprising:
  a boot according to a first aspect of the present invention; and
  a securing strap engaged with the retention means for retaining the boot to the hoof, the strap having two sections which, in use, extend from the retention means, around respective sides of a horse's pastern bone and secure to a ventral portion of the upper.

In embodiments of the invention, the boot further comprises a tensioner for adjusting a tension of the strap around the horse's pastern bone.

In embodiments of the invention, the tensioner is configured to draw together the two sections of the strap extending from the retention means such that the two sections hug a rear of the pastern bone.

In embodiments of the invention, the tensioner comprises a sleeve having an opening for receiving the strap.

In embodiments of the invention, the tensioner comprises openings configured to receive respective sections of the strap.

In embodiments of the invention, in use, the tensioner is configured to sit against an upper end of bulbs of the hoof.

In embodiments of the invention, in use, the tension applied by the tensioner to the strap can be adjusted by moving the tensioner relative to the strap.

According to a third aspect of the present invention, there is provided a tensioner for use with a boot according to a first and/or second aspect of the present invention.

According to a fourth aspect of the present invention, there is provided a method of protecting a horse's hoof, comprising:
  (a) providing an equine hoof boot according to a first aspect of the present invention;
  (b) engaging a securing strap to the boot via the retention means thereof such that two sections of the strap extend from the retention means;
  (c) applying the boot to a horse's hoof;
  (d) strapping the two sections of the strap around respective sides of the horse's pastern bone and coupling the sections to a front of the boot to secure the boot to the hoof.

In embodiments of the invention, the method further comprises:
  prior to step (c), securing a tensioner to the strap; and
  after step (d), adjusting a position of the tensioner relative to the strap to draw together the sections of the strap extending from the retention means so as to tighten the strap around the pastern bone.

BRIEF DESCRIPTION OF THE SEVERAL VIEWS OF THE DRAWINGS

Embodiments of the invention will now be described, by way of example only, with reference to the accompanying drawings, in which.

DESCRIPTION OF SPECIFIC EMBODIMENTS OF THE INVENTION

Figure 5:
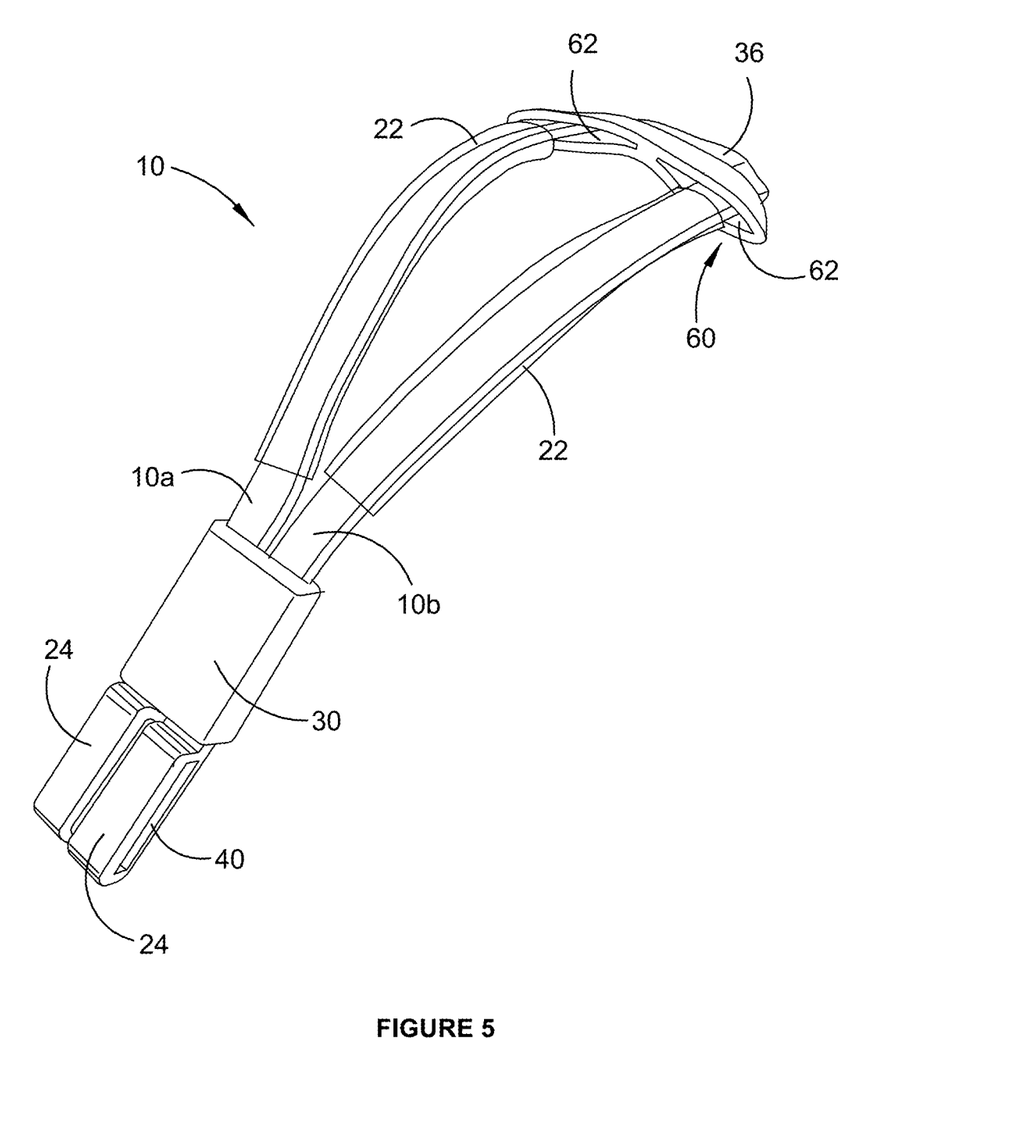
FIG. 5 is a perspective view of a securing strap according to an embodiment of the invention, the strap being configured for use with the boot of FIG. 1.

Embodiments of the present equine boot 12 are shown in FIGS. 1 to 4 and 5 to 9. The boot 12 is configured to be secured to a horse's hoof via a securing strap 10. An embodiment of the securing strap 10 is shown in FIG. 5.

FIGS. 6 to 9 show the strap 10 fitted to the boot 12, the boot 12 being fitted to a horse's hoof. The strap 10 is configured for securing the boot 12 to the hoof at a location generally above the horse's coronary band.

General aspects of the strap 10 will first be described, followed by a description of the boot 12 with which the strap 10 is configured to be used.

The strap 10 is configured for fixing to the boot 12 at generally central locations (in the middle in other words), with respect to the pastern bone, on or at a front and rear of the boot 12. The term "generally central" is intended to mean in the centre or approximately 20 mm on either side of the centre, though this dimension may vary in other embodiments. It will also be appreciated that the strap 10 may be fixed to an intermediate part of the boot 12 which then connects to a central part of the boot 12.

Securing the strap 10 to the hoof at central locations provides that forces acting on the boot 12 to dislodge it are transmitted to the horse's hoof at generally central locations to limit rotation and/or leveraging and dislodgement of the boot 12. Such an arrangement has been found to significantly improve retention of a boot 12 on a horse's hoof.

Figure 6:
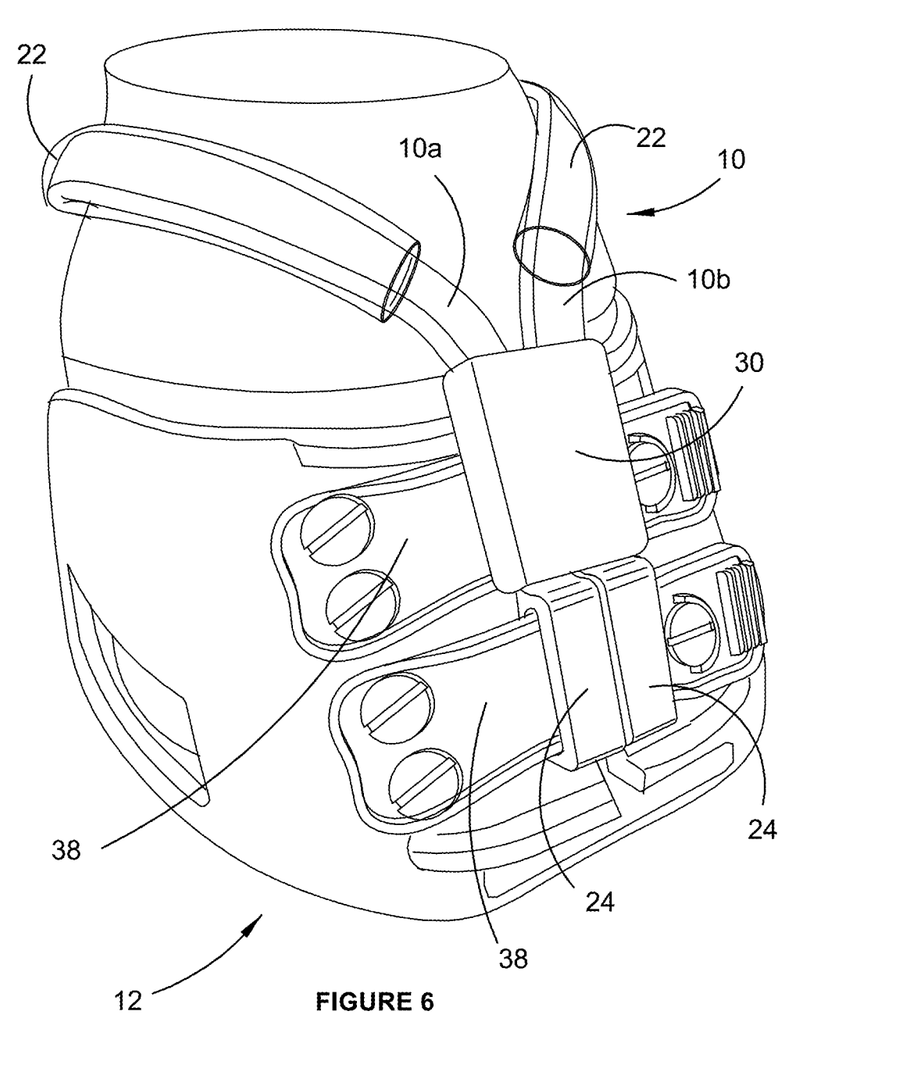
FIG. 6 is a front perspective view of a horse hoof with the boot of FIG. 1 and the strap of FIG. 5 fitted thereto.

With reference to FIG. 6, the strap 10 has two sections 10a, 10b, each of which extend either side of the horse's pastern bone to secure the boot 12 to the hoof. The strap sections 10a, 10b sit along an articulation joint between the lower pastern bone and short pastern bone. The strap 10 comes close to the pastern bone on both sides and is configured to hug or follow the natural contour of the pastern bone as a relatively tight fit, with only a small space, such as a finger or so, between the pastern bone and the strap 10.

The two sections 10a, 10b can be branches or segments passing around opposite sides of the hoof. It will be appreciated that the sections 10a, 10b may be separate portions of the same part, though in alternative forms the strap 10 may be formed of multiple parts.

In an alternative form, sections 10a, 10b may be a removable strap extending around the pastern bone which may be secured with conventional fastenings such as a buckle or catch.

In the depicted embodiment, the strap 10 also comprises generally cylindrical tubes 22 through which respective strap sections 10a, 10b extend (see FIGS. 5 to 9). The cylindrical tubes 22 are depicted as transparent in the Figures, and act to provide a cushion between the horse's hoof and the strap sections 10, 10b.

The tubes 22 may be relatively deformable and may have an internal diameter that is approximately the same or slightly larger than the width of each strap section 10a, 10b. In this way, an air gap is formed between the hoof-facing surface of each strap section 10a, 10b, and the adjacent inner surface of the corresponding cylindrical tube 22. As such, if and when the strap sections 10a, 10b move towards the hoof (e.g. during movement of the horse), rather than the strap sections 10a, 10b directly contacting the hoof, it is the outer hoof-facing surface of the cylindrical tubes 22 which contact the hoof, upon which, the hoof-facing surface of the cylindrical tubes 22 compress towards the corresponding strap section 10a, 10b, closing the previously described air gap. In this way, the deformable cylindrical tubes 22 not only protect the strap sections 10a, 10b from wear, they also provide a cushioning barrier between the strap sections 10a, 10b and the pastern bone of the hoof.

In the illustrated embodiments, the two sections 10a, 10b come together at a location above the horse's coronary band at a centrally positioned coupler 30 above the front of the boot 12. In alternative embodiments, the two sections 10a, 10b are joined and become a single piece at the generally central location at the front of the hoof, and secure to the boot 12 at a rear thereof.

The coupler 30 is preferably in the form of a sleeve, though may take other forms such as an adjustable sleeve, lock, clasp or other securement or fastening for keeping the two sections 10a, 10b in position. By keeping the two sections 10a, 10b in position and relatively tight, they act as a bracelet extending partially around the hoof so that movement of the boot 12 downwardly relative to the hoof can be minimised.

In alternative embodiments, the coupler 30 may be provided at a rear or side of the hoof, provided that it secures the sections 10a, 10b of the strap 10 in position on the hoof while allowing the sections 10a, 10b to be spread apart for fitment to the hoof. In such embodiments, the strap 10 may be a single part securable to the front of the boot 12, with multiple parts securing to a rearward portion of the boot 12.

The inventor has determined that the two sections 10a, 10b should come together and be held together at a location in a range between the coronary band to a position approximately 40 mm above the coronary band.

It is envisaged that the coupler 30 may have a pawl configured for engagement with teeth formed on the two sections 10a, 10b. In this arrangement, the coupler 30 may be adjusted and tightened so that the strap 10 circumscribes the hoof like a band or bracelet.

In other embodiments, the coupler 30 may be a sleeve configured for holding the two sections 10a, 10b together. In such a configuration, a lower part of the coupler 30 may engage an upper part of the boot 12 to hold it in position.

In the illustrated embodiments, the two sections 10a, 10b extend through the coupler 30 for fixing to a forward part of the boot 12 near the sole 14. It will be appreciated that in other embodiments, the two sections 10a, 10b may secure to the coupler 30, which itself is then coupled to a forward part of the boot 12 near the sole 14, using an extension of the coupler 30 itself or another member.

The two sections 10a, 10b preferably secure to a fastening strap 38 at the front of the boot 12, though with other boots a different securement method may be used. For example, additional fasteners may be provided on the front of the boot 12 for anchoring the strap 10.

In the depicted embodiment, each section 10a, 10b of the strap 10 terminates in an eye-like end 24. Each end 24 has an opening or through-hole 40 such that each eye 24 defines a sleeve. With reference to FIG. 6, in use, the sleeves 24 are passed through the coupler 30 and then arranged adjacent to one another so as to receive, through the openings 40 thereof, a front fastening strap 38 of the boot 12.

FIGS. 1 to 4 show an embodiment of a boot 12 configured to cooperate with the securing strap 10. The boot 12 comprises a ground-engaging sole 14 comprising an interior surface 28 configured to receive an underside of the hoof. The interior surface 28 may be substantially closed to cover and protect the underside of the hoof.

The boot 12 also comprises an upper 16 which, in use, is configured to receive a front and respective sides of a wall of the horse's hoof. The upper 16 includes a ventral portion 18 at a front of the boot 12. In use, an inside of the ventral portion 18 is contactable with a toe of the hoof. The upper 16 also comprises two opposed walls 56 adapted to receive respective sidewalls of the hoof.

Figure 1:
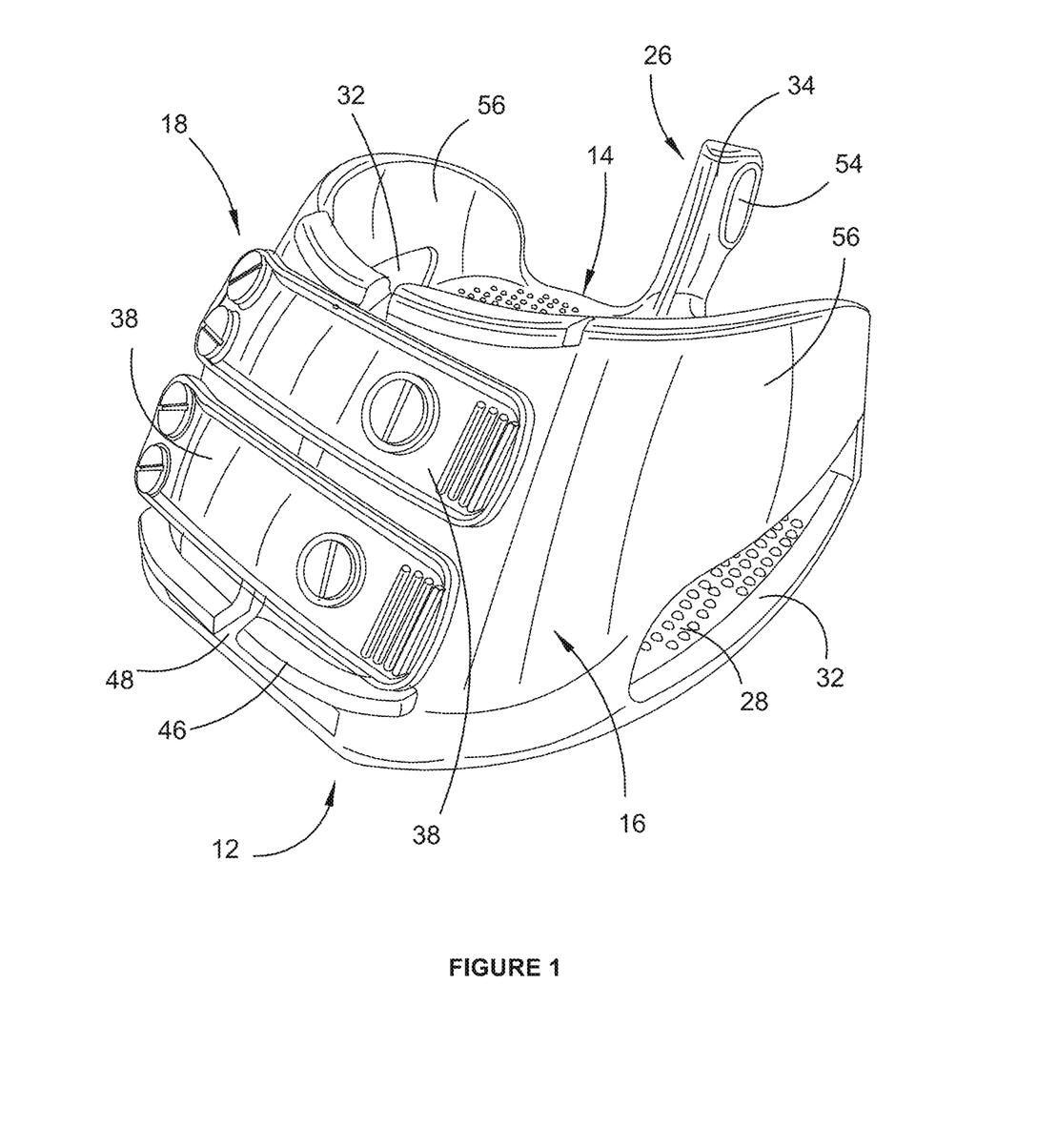
FIG. 1 is a front perspective view of an equine hoof boot according to an embodiment of the invention.
Figure 2:
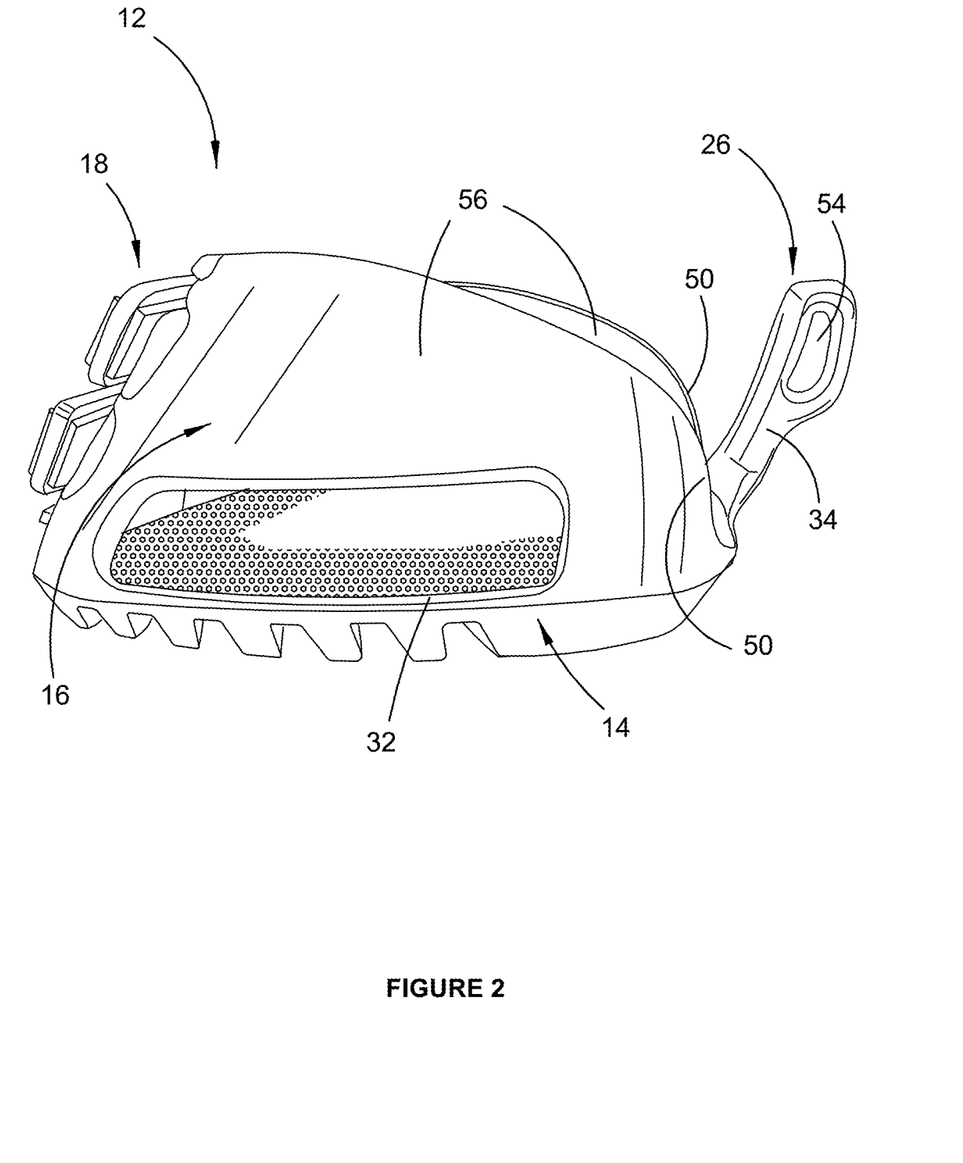
FIG. 2 is a side perspective view of the boot of FIG. 1.
Figure 3:
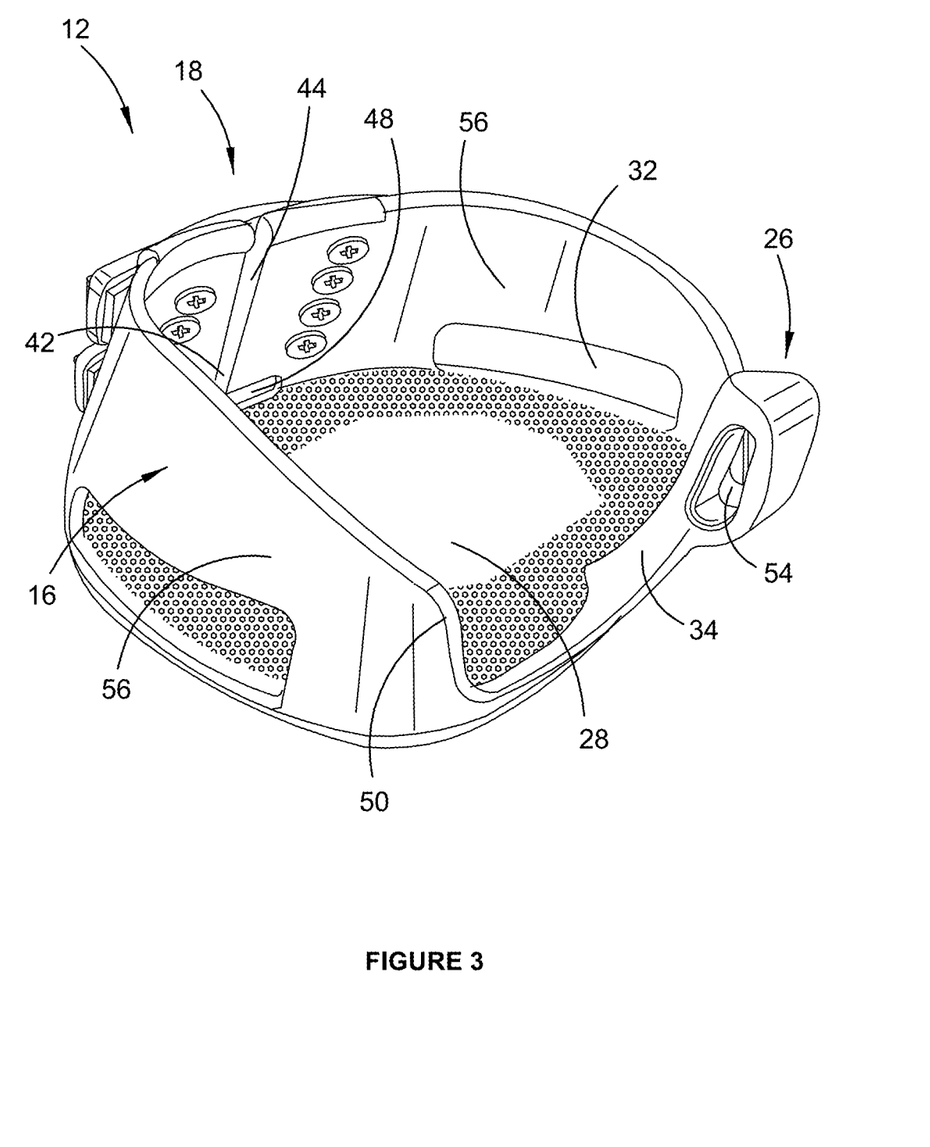
FIG. 3 is a rear perspective view of the boot of FIG. 1.
Figure 4:
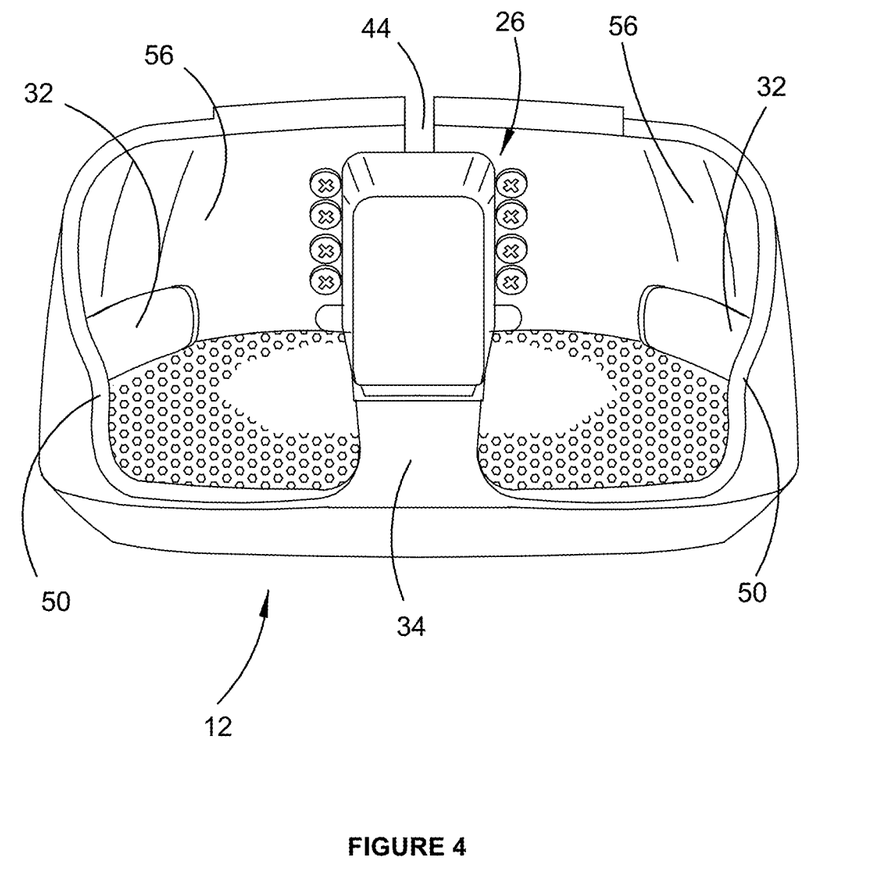
FIG. 4 is a rear view of the boot of FIG. 1.

The ventral portion 18 has an opening 42 extending therethrough to a level of the interior 28 of the sole 14 to allow the ventral portion 18 to be spread open for application of the boot 12 to the hoof. The opening 42 comprises a substantially vertical slit 44.

The opening 42 also comprises a lateral opening 48 extending through a lower end of the upper 16 which opens up to the level of the interior 28 of the sole member 14.

The vertical slit 44 and the lateral opening 48 together define an upside-down T-shaped opening in the ventral portion 18. Above the lateral opening 48 is a protective bar or bumper 46 that forms a ledge above the opening 48.

The upper 16 and sole 14 may be integrally formed. Preferably, the upper 16 and sole 14 together define a shell which at least partially covers and protects the front and sides of the hoof. The shell may be formed from a relatively rigid material which is nevertheless sufficiently flexible so that the ventral portion can be pried open to apply the hoof to the boot 12, and such that during travel, the shell provides a certain amount of give to accommodate and absorb pressure applied to the boot 12 by the hoof.

In the illustrated embodiments, the boot 12 has at least one fastening strap 38 for closing the opening/slit 48, with the two sections 10a, 10b of the securing strap 10 being securable to the fastening strap 38.

In the illustrated embodiments, the boot 12 comprises two fastening straps 38, the two sections 10a, 10b being securable to a lower one of the fastening straps 38 (see FIG. 6).

The rear of the boot 12 (see FIGS. 3, 4, 8 and 9) is substantially open. As such, the bulbs of the hoof are substantially uncovered and are generally free to protrude out of a rear of the boot 12 (see FIG. 7). In this way, the present boot 12 may be more accommodating of hooves of different sizes, particularly hooves whose bulbs may vary in shape and size. This is because rather than having a generally closed rear that rubs against or engages the bulbs, the rear of the present boot 12 is generally open and generally does present a physical limit or obstruction to the bulbs. Furthermore, being more open than previous boots, boot 12 is better suited for use in conditions where material or debris, such as sand in particular, is likely to be collected in the boot and which can cause rubbing on the hoof.

A rear of the boot 12 comprises a retention means 26 at or toward a rear of the boot (also referred to herein as a cleft-engaging member/means or retention member) via which the securing strap 10 can be secured to or at a rear end of the boot 12.

In the depicted embodiment, the retention member 26 comprises a shank or web 34 which extends upwardly and rearwardly from the sole member 14 at a rearward and generally central location, such that in use, it is positioned proximate the cleft between the bulbs of the hoof. For example, the retention means 26 may be positioned such that it sits between or engages the cleft. Engagement of the cleft by the retaining means 26 may assist with impeding against rotation of the boot 12 relative to the hoof.

The shank or web 34 may be generally half-round in cross-section, wherein the rounded surface of the shank or web 34 may be directed towards the cleft when the boot 12 is worn.

The retention member 26 may be generally rigid and helps limit twisting or relative rotation between the hoof and boot 12. Preferably, the cleft-engaging retention member 26 extends up through the cleft between the bulbs to a height at approximately the lower end of the digital cushion of the hoof. Although generally rigid, the retention member 26 also permits a degree of flexibility. In use, it is capable of being flexed in different directions. In this way, the retention means 26 can flex in response to movement and pressure from the horse's hoof.

The retention member 26 may be between approximately 40 mm and 60 mm high, as measured vertically upwards from the interior hoof-receiving surface 28 of the sole 14. Since the retention member 26 curves slightly away from the hoof, the length of the retention member 26 may be greater than its vertical height as measured upwardly from the interior surface 28 of the sole 14.

In other forms, the retention member 26 may be at the level of the sole 14, though in such embodiments, the strap 10 would need to be configured to prevent separation and movement over the bulbs, using a tensioning means for example, such as that described below.

The height of the retention member 26 is configured such that the strap 10 can sit over or on the bulbs of the horse's hoof, yet a top of the retention member is below the pastern bone where it meets a top of the bulbs (and therefore a top of the retention member is also below an uppermost region of the bulbs) so that the strap 10 does not contact and impede the pastern bone during articulation of the hoof as the lower pastern bone hinges on the short pastern bone. Were this to happen, impact and rubbing could occur.

An upper end or head of the retention member 26 is formed with an opening 54 sized to receive and retain the strap 10 to the boot 12. This allows the strap 10 to engage the boot 12 at a location on top of the bulbs of the hoof. The dimensions of the opening 54 are slightly larger than the width and/or thickness of two sections 10a, 10b of the strap 10. As such, the strap 10 can be manually passed through the opening 54 with relative ease, and yet the strap 10 does not have much room to move or jostle relative to the boot 12 during use.

The sleeve-like ends 24 of each strap section 10a, 10b are defined by respective enlarged heads 24 (see FIG. 5), a thickness or height thereof being greater than the width of the opening 54 of the retention member 26. As such, when fitting the strap 10 to the boot 12, the heads 24 may be manually deformed and urged through the opening 54 of the retention member 26. In this way, when the strap 10 has been passed through the opening 54 of the retention member 26, the strap sections 10a, 10b may be free to move and be adjusted relative to the retention member 26, whereas it is not easy for the strap 10 to be dislodged from the boot 12 because the enlarged heads 24 of the strap 10 will not readily escape or pass through the opening 54 without being manually urged therethrough.

In the Figures, the retention member 26 is depicted as extending from, and being integrally formed with, the sole. Of course, the retention member 26 may take on other various forms and constructions. For example, the retention member 26 may be a separate part secured to the sole, or may be associated with or extend from the upper 16. For example, in embodiments where the rear of the boot 12 is generally open, the upper 16 may comprise rearward features, such as one or more lateral straps or a centrally disposed catch or sleeve configured to releasably secure the securing strap 10.

Figure 7:
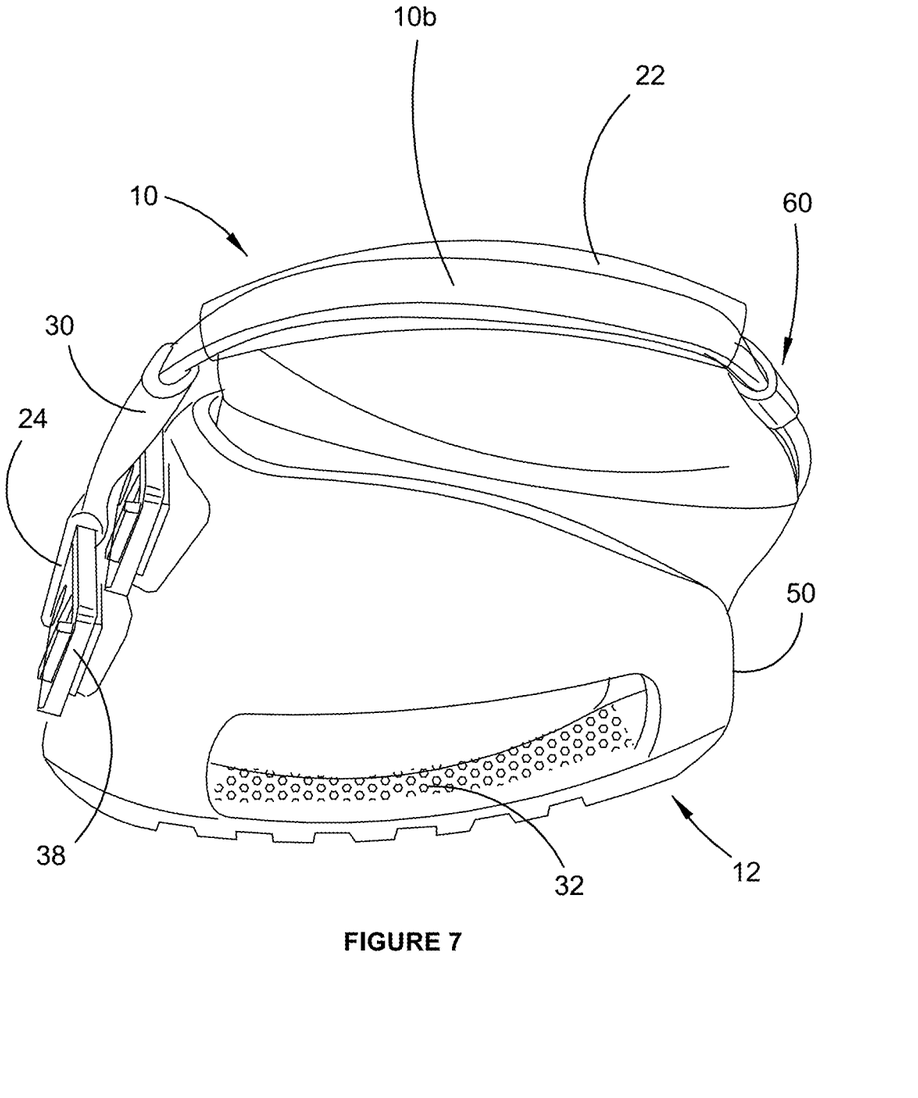
FIG. 7 is a side perspective view of the hoof fitted with the boot and strap of FIG. 6.
Figure 8:
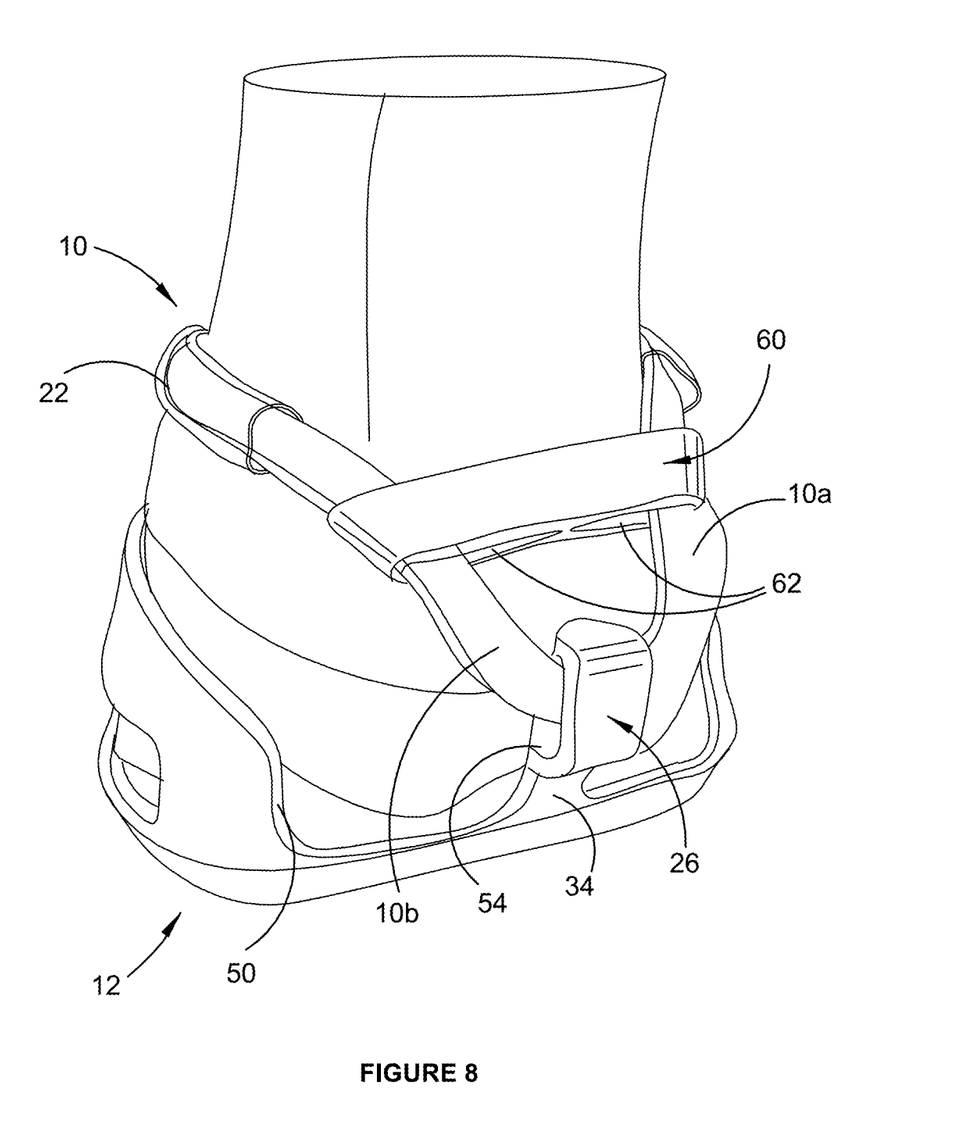
FIG. 8 is a rear perspective view of the hoof fitted with the boot and strap of FIG. 6.
Figure 9:
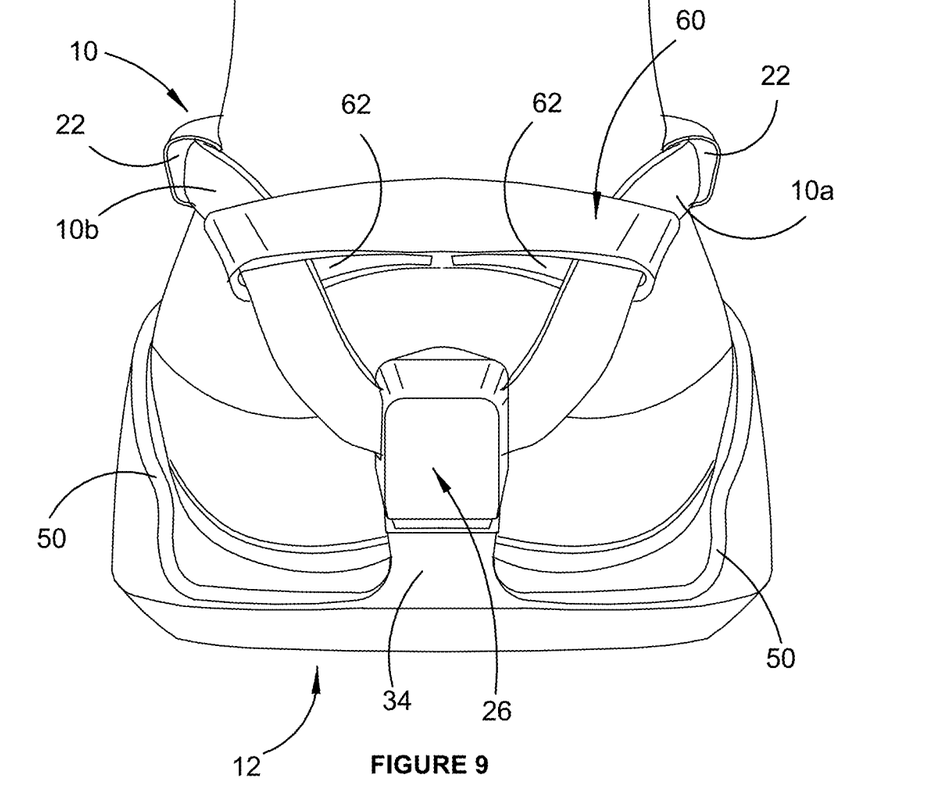
FIG. 9 is a rear view of the hoof of the hoof fitted with boot and strap of FIG. 6.

With reference to FIGS. 7 to 9, the upper 16 of the boot 12 comprises sidewalls 56 which, in use, are contactable against respective sides of the hoof. The sidewalls 56 terminate toward or at a rear of respective sidewalls of the hoof. As such, the rear of the boot 12 is substantially open and, with reference to FIG. 9, takes a substantially w-shaped configuration, wherein the retention member 26 forms the centre 'leg' of the 'w' and is taller than the outer 'legs' of the 'w' formed by respective rear ends 50 of the sidewalls 56.

Since the strap 10 and the cleft-engaging retention member 26 help retain the boot 12 to the hoof and impede relative rotation therebetween, in embodiments of the boot 12, the respective rear ends 50 of the sidewalls 56 need not engage an outer periphery of the bulbs to further secure the boot 12 to the hoof.

With reference to FIG. 7, each sidewall 56 of the upper 16 comprises a lower, generally centrally disposed, elongate opening or slot 32. Each opening or slot 32 is preferably formed such that a lower end thereof is substantially level with the interior sole-receiving surface 28. These generally elongate slots 32 are shaped and sized to accommodate hoof growth. While not shown, it is envisaged that the sides of the hoof may also protrude through the slots 32. In this way, the boot 12 is more readily able to accommodate hooves of a range of sizes. The boot 12 may also be worn for longer cycles before removal for trimming of excess hoof growth since the elongate openings 32 are able to accommodate a certain amount of hoof growth. Advantageously, even hoof growth extending from a lower periphery of the hoof may extend through the elongate slots 32.

In embodiments of the boot 12, the retention member 26 need not have an opening 54 for receiving the strap 10; other means for securing the strap 10 to the retention member 26 are within the scope of the present specification.

For example, the retention member 26 may comprise a thicker or wider top or head portion, and a rear or central end 36 of the securing strap 10 may comprise an opening configured to stretch over the enlarged head portion of the retention member 26 so as to be releasably retained thereto.

In other embodiments, the strap 10 may be secured to the boot 12 with a fastener.

In another example, the strap 10 may comprise an elastic opening, and the retention member 26 may comprise a fastening member, such as a button or rivet, which can be urged through the elastic opening to releasably secure the strap to the retention member. Of course, the fastening method may be reversed in that the strap 10 may comprise the fastening member, and the retention member 26 may comprise the elastic opening for receiving the fastening member of the strap.

In other embodiments, the retention member 26 and strap 10 may be integrally formed, in which case the strap sections 10a and 10b may simply extend outwardly from the retention member 26.

With reference to FIGS. 6 to 9, the securing strap 10 is secured to the retention member 26 of the boot 12 and wraps around the sides of the pastern bone of the horse.

Figure 10:
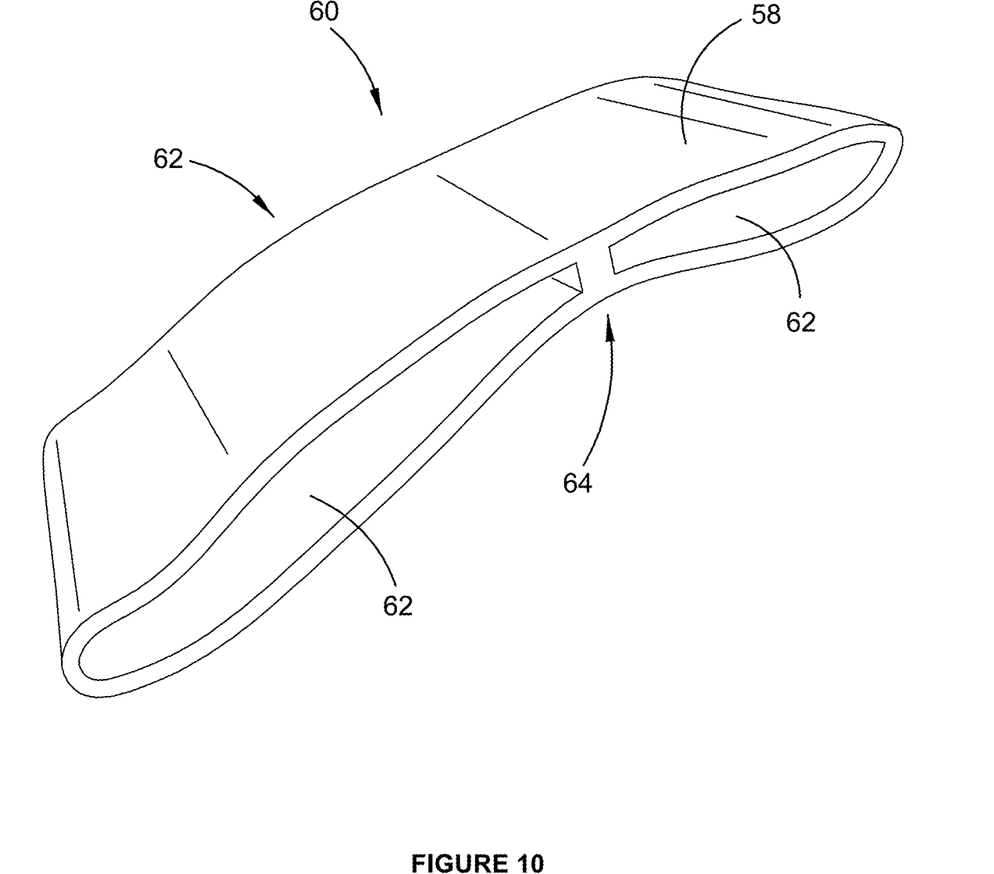
FIG. 10 is a front perspective view of a tensioner of the strap of FIG. 5.

A tensioner or collar 60, an embodiment of which is shown in FIG. 10, is releasably secured to the securing strap 10 towards a rear end of the horse's pastern bone.

The depicted tensioner 60 is in the form of a sleeve having left and right-side openings 62 extending therethrough, each for receiving a respective one of the two sections 10a, 10b of the strap 10. With reference to FIGS. 8 and 9, the tensioner 60 acts to apply tension to the strap 10 so that the strap 10 wraps more tightly around or otherwise conforms more closely to the horse's pastern bone. The tensioner 60 also acts to hold the strap sections 10a, 10b in place and stops them from spreading apart under load, thereby preventing the strap slipping over the bulbs and dislodging.

FIG. 10 shows the tensioner 60 on its own. Viewed from above, the tensioner 60 has a generally trapezoidal profile. In use, the longer end 64 of the trapezoid is configured to face the hoof. The opposite shorter end 66 of the trapezoid is configured to face the retention member 26. The width of the tensioner 60 reduces from the longer end 64 towards the shorter end 66 in accordance with the reducing distance between the two sections 10a, 10b of the strap 10 as the sections 10a, 10b progress around a rear of the hoof and towards the retention member 26.

In the illustrated embodiment, the longer end 64 of the tensioner 60 is approximately 65 mm and the opposite shorter end 66 is approximately 50 mm. The tensioner 60 may be formed from an approximately 1.5 mm thick TPU, and although flexible, is sufficiently rigid to resist stretching.

In use, to fit the strap 10 to the boot 12, one of the two strap sections 10, 10b is first passed through the opening 54 in the retention member 26 to engage the boot 12 and the strap 10 together. The tensioner 60 is then secured to the strap 10 by feeding both sections 10a, 10b of the strap 10 through respective openings 62 of the tensioner 60 such that the tensioner 60 is positioned towards a midpoint of the strap 10.

The boot 12 can then be applied to the horse's hoof and the sections 10a, 10b can be passed around the pastern bone and secured to the front of the boot 12, as previously described, with the tensioner 60 positioned toward a rear end of the pastern bone. It will be appreciated that in other embodiments, the sections 10a, 10b of the strap 10 may pass over each other and be secured to the ventral portion 18 at a location offset from a central plane.

Preferably, a lower surface of the tensioner 60 sits securely against an upper end of the horse's bulbs, like a cap or cover on top of the bulbs. In this way, the tensioner 60 braces against an upper end of the horse's bulbs and helps resist downward displacement of the boot 12 relative to the hoof. For example, when the hoof and boot 12 are withdrawn from mud and suction acts to pull the boot 12 downwardly and off the hoof, the tensioner 60 and/or strap 10 urges downwardly against an upper surface of the bulbs, thereby helping to resist downward displacement of the boot 12 relative to the hoof. By positioning the retention member 26 centrally on the boot 12, the force acting to displace the boot 12 acts centrally to the boot 12, thereby further reducing twisting or rotation of the boot 12.

The tensioner 60 acts to draw both sections 10a, 10b of the strap 10 toward one another so that they hug more closely to the pastern bone of the horse. With reference to FIGS. 8 and 9, the tensioner 60 can be slid up and down the strap sections 10a, 10b (i.e., towards and away from the pastern bone) to adjust the tension applied by the strap 10 around the horse's pastern bone. This allows the strap 10 to be adjusted to fit closely to hooves of varying sizes and shapes.

The height of the retention member 26 and length of the tensioner 60 are selected to ensure that the strap 10 can sit over the bulbs of the horse's hoof, yet below the pastern bone where it sits on top of the bulbs so that the strap does not contact the pastern bone. The shape and size of the tensioner 60, including the openings 62 thereof, may of course vary in accordance with the configuration of the boot 12, strap 10 and/or hoof.

Of course, tensioning devices for drawing the sections 10a, 10b of the strap 10 together need not have two openings 62 and could simply have one opening through which both strap sections 10a, 10b are received.

An alternative tensioning device may be a simple strap or collar that extends over the strap sections 10a, 10b. In another embodiment, the tensioner may not have openings at all, and may simply be a section of an elastomeric material that can be stretched outwardly and fastened to each section of the strap 10. For example, each section of the strap may have fastening members, such as an outwardly projecting button or rivet, and the tensioner may have corresponding openings for releasably receiving the fastening members. In this embodiment, the tendency for the stretched elastomeric tensioning device to return to its unstretched state acts to urge both sections of the strap together, thereby drawing them toward one another so they hug more closely against a rear end of the horse's pastern bone. Alternatively, tensioning devices may be integrally formed with and extend from strap sections 10a, 10b to be secured together.

The tensioner 60 may also be associated with the retention member 26. In such an embodiment, the retention member 26 would be of a height discussed below but have a generally upward extension that is shaped to bow outwardly to allow for articulation of the pastern bones and provide a sleeve or collar for securing strap sections 10a, 10b. In such a configuration, tension 60 may be integrally formed with or otherwise connected to the retention member 26.

In another embodiment, the upper 16 may also comprise a dorsal portion at a rear of the boot 12. In use, an inside of the dorsal portion is contactable with a rear of the hoof. The dorsal portion may include bulb-engaging means for engaging peripheries of bulbs of the hoof to impede rotation of the boot 12 relative to the hoof.

The bulb engaging means may be formed around apertures formed in a rear of the upper 16. The apertures may be configured to capture, grip or otherwise engage the peripheries of respective bulbs of the hoof such that the bulbs protrude through respective apertures when the boot 12 is worn, as described and shown in patent publication number WO2018218307A1. The apertures may extend to the level of the interior hoof-receiving surface 28 of the sole 14.

In the illustrated embodiment, the strap 10 runs flat over a top of the bulbs and may lay at least partially on top of the bulbs. This reduces or avoids irritation to the hoof. Were the strap 10 to be positioned higher on the hoof it could interfere with the leg. Were the strap 10 to be positioned lower it could interfere with the bulbs.

It will be appreciated that there are many other ways in which the securing strap 10 may engage the retention means 26, particularly for boots of other configurations, though the illustrated retention means 26 is easily constructed, simple and effective.

For example, the strap 10 may simply secure to fasteners associated with the retention means 26, or to a side or rear of the boot 12, preferably near an upper part of the boot 12.

It will also be appreciated that the strap 10 can also be fitted to other differently configured boots. Furthermore, although the strap 10 is illustrated as a separate component, in other embodiments the strap 10 may be integrally formed with or secured to the boot 12 and may be a permanent or temporary fixture.

To apply the present boot 12 to a hoof, firstly one of the two strap sections 10a, 10b is first passed through the opening 54 in the retention member 26 such that a generally rearward and central region of the strap 10 is positioned at or near the retention member 26.

Next, each section 10a, 10b may be passed through respective openings 62 of the tensioner 60 such that the tensioner 60 can be slid towards a rear of the boot 12 so that it is positioned generally adjacent to the retention member 26.

The boot 12 may now be applied to the hoof, whereupon the two strap sections 10a, 10b can be passed around the opposite sides of the hoof on either side of the pastern bone and above the coronary band. The sleeve-like ends 24 of the respective strap sections 10a, 10b are then fed through the coupler 30 and drawn tight around the hoof.

A lower fastening strap 38 can then be inserted through each of the openings of the sleeve-like ends 24 of the strap sections 10a, 10b, and then fastened to the boot 12, along with the uppermost fastener 38. After a quick fitment check, the boot 12 is ready for use.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An equine boot comprising:
   a sole for receiving a bottom of a horse's hoof;
   an upper for receiving at least a portion of a wall of the hoof, the upper comprising opposed side walls terminating towards a rear of the hoof such that a rear of the boot is substantially open, and, in use, the bulbs of the hoof are generally uncovered;
   a securing strap; and
   an upwardly extending retention means at a rear of the boot comprising a shank or web extending upwardly from a rearward and central location of the sole, the shank or web being unconnected to the upper and having at an upper end thereof a free end with a securement for receiving the securing strap, the securement having an opening configured for receiving the strap, wherein the sole, upper and shank are integrally formed together; and wherein the securing strap is securable to the boot and hoof for retaining the boot thereto, the retention means being configured such that, in use, it engages a cleft of the hoof and the bulbs are substantially uncovered, wherein the securing strap is engaged with the retention means for retaining the boot to the hoof, the securing strap having first and second sections which, in use, extend from the retention means, around respective sides of a horse's pastern bone and come together at a coupler located at central location above the pastern to secure to a ventral portion of the upper at a central location, wherein the first and second sections of the securing strap are aligned in parallel as they pass over a coronary band in a substantially vertical direction, and wherein the respective ends of the first and second sections each have a lateral opening passing therethrough, and the lateral openings are aligned with one another in the substantially parallel alignment such that a fastening strap can pass through both lateral openings at the respective ends of the first and second sections.

2. The boot of claim 1, wherein the securement is configured for releasably securing the strap to the boot.

3. The boot of claim 1, wherein in use, the retention means is configured to engage the cleft.

4. The boot of claim 1, wherein the opposed side walls are configured to at least partially cover respective sides of the hoof wall.

5. The boot of claim 1, wherein the sole and the upper define a shell configured to substantially cover an underside of the hoof and the front and sides of the hoof wall.

6. The boot of claim 1, wherein a front of the upper is formed with one or more openings adapted to allow sidewalls of the upper to be pried away from one another for fitting of the hoof to the boot.

7. The boot of claim 1, wherein sidewalls of the upper comprise respective elongate openings adapted to accommodate hoof growth.

8. The boot of claim 1, further comprising a tensioner for adjusting a tension of the strap around the horse's pastern bone.

9. The boot of claim 8, wherein the tensioner is configured to draw together the first and second sections of the strap extending from the retention means such that the two sections hug a rear of the pastern bone.

10. The boot of claim 8, wherein the tensioner comprises a sleeve having an opening for receiving the strap.

11. The boot of claim 8, wherein the tensioner comprises openings configured to receive respective sections of the strap.

12. The boot of claim 8, wherein in use, the tensioner is configured to sit against an upper end of bulbs of the hoof.

13. The boot of claim 8, wherein the tensioner is configured such that tension applied thereby to the strap is adjusted by moving the tensioner relative to the strap.

14. A method of protecting a horse's hoof, comprising:
(a) providing the equine hoof boot according to claim 1;
(b) engaging the securing strap to the boot via the retention means thereof such that the first and second sections of the strap extend from the retention means;
(c) applying the boot to a horse's hoof;
(d) strapping the first and second sections of the strap around respective sides of the horse's pastern bone and coupling the sections to a front of the boot to secure the boot to the hoof.

15. The method of claim 14, further comprising:
prior to step (c), securing a tensioner to the strap; and
after step (d), adjusting a position of the tensioner relative to the strap to draw together the first and second sections of the strap extending from the retention means so as to tighten the strap around the pastern bone.

16. An equine boot comprising:
a sole for receiving a bottom of a horse's hoof;
an upper for receiving at least a portion of a wall of the hoof, the upper comprising opposed side walls terminating towards a rear of the hoof such that a rear of the boot is substantially open, and, in use, the bulbs of the hoof are generally uncovered; and wherein a front of the upper is formed with one or more openings adapted to allow sidewalls of the upper to be pried away from one another for fitting of the hoof to the boot;
a securing strap; and
an upwardly extending retention means at a rear of the boot comprising a shank or web extending upwardly from a rearward and central location of the sole, the shank or web being unconnected to the upper and having at an upper end thereof a free end with a securement for receiving the securing strap, the securement having an opening configured for receiving the strap, wherein the sole, upper and shank are integrally formed together; and wherein the securing strap is securable to the boot and hoof for retaining the boot thereto, the retention means being configured such that, in use, it engages a cleft of the hoof and the bulbs are substantially uncovered, wherein the securing strap is engaged with the retention means for retaining the boot to the hoof, the securing strap having first and second sections which, in use, extend from the retention means, around respective sides of a horse's pastern bone and come together at a coupler at a central location above the pastern to secure to a ventral portion of the upper at a central location, wherein the first and second sections of the securing strap are aligned in parallel as they pass over a coronary band in a substantially vertical direction, and wherein the respective ends of the first and second sections each have a lateral opening passing therethrough, and the lateral openings are aligned with one another in the substantially parallel alignment such that a fastening strap can pass through both lateral openings at the respective ends of the first and second sections.

* * * * *